(12) United States Patent
Meskauskas et al.

(10) Patent No.: US 7,853,697 B2
(45) Date of Patent: Dec. 14, 2010

(54) HANDLING SUSPENDED NETWORK STATE OF A TERMINAL DEVICE

(75) Inventors: Paulius Meskauskas, Espoo (FI); Georg Mayer, Helsinki (FI)

(73) Assignee: Nokia Corporation (FI)

(*) Notice: Subject to any disclaimer, the term of this patent is extended or adjusted under 35 U.S.C. 154(b) by 1082 days.

(21) Appl. No.: 11/081,639

(22) Filed: Mar. 17, 2005

(65) Prior Publication Data

US 2006/0149847 A1 Jul. 6, 2006

(30) Foreign Application Priority Data

Jan. 3, 2005 (EP) .................................. 05000015

(51) Int. Cl.
G06F 15/16 (2006.01)
G06F 15/173 (2006.01)
H04W 4/00 (2009.01)

(52) U.S. Cl. .................. 709/227; 709/223; 709/228; 455/435.1

(58) Field of Classification Search ................ 709/223, 709/227, 228
See application file for complete search history.

(56) References Cited

U.S. PATENT DOCUMENTS

| | | | |
|---|---|---|---|
| 6,885,861 B2 * | 4/2005 | Koskelainen | 455/414.2 |
| 7,222,165 B1 * | 5/2007 | Ellis et al. | 709/223 |
| 2003/0040280 A1 * | 2/2003 | Koskelainen | 455/67.1 |
| 2004/0103157 A1 * | 5/2004 | Requena et al. | 709/206 |
| 2004/0184452 A1 | 9/2004 | Huotari et al. | |
| 2004/0203894 A1 | 10/2004 | Watanabe et al. | |
| 2004/0205212 A1 | 10/2004 | Huotari et al. | |
| 2005/0159161 A1 * | 7/2005 | Florkey et al. | 455/450 |
| 2006/0140189 A1 * | 6/2006 | Wu et al. | 370/395.2 |

FOREIGN PATENT DOCUMENTS

EP 1 244 261 A 9/2004

OTHER PUBLICATIONS

A. B. Roach, Session Initiation Protocol (SIP)-Specific Event Notification, Jun. 2002, IETF RFC 3265.*
A. B. Roach, Session Initiation Protocol (SIP)-Spectfic Event Notification (RFC 3265), Published by IETF on Jun. 2002.*
Rosenberg J., Dynamicsoft, "A Session Initiation Protocol (SIP) Event Package for Registrations" IETF Standard, Internet Engineering Task Force, IETF, CH, Mar. 2004, pp. 1-26.
Mouly M. et al. "Mobility and Security Management" GSM System for Mobile Communications, Lassay-Les-Chateaux, Europe Media, FR, 1993, pp. 432-498.

(Continued)

*Primary Examiner*—Nathan Flynn
*Assistant Examiner*—Jeong S Park
(74) *Attorney, Agent, or Firm*—Mintz Levin Cohn Ferris Glovsky and Popeo, P.C.

(57) ABSTRACT

The present invention relates to a method and terminal device for handling a suspended network state, wherein the end of a suspended network state is detected and subscription to a state event package is initiated in response to the detected end of suspension. Based on information given in a response to the subscription, registrations of user identities are updated. Thereby, the registration state of the user and the user's identities can always be kept actual, even after a suspension of the network connection.

20 Claims, 4 Drawing Sheets

OTHER PUBLICATIONS

ETSI TS 123 141 V6.7.0 Universal Mobile Telecommunications System (UMTS); Presence service; Architecture and functional description; Stage 2 (3GPP TS 23.141 version 6.7.0 Release 6); Sep. 2004; pp. 1-36.

ETSI TS 123 060 V6.7.0 Digital Cellular Telecommunications System (Phase 2+); Universal Mobile Telecommunications System (UMTS); General Packet Radio Service (GPRS); Service Description; Stage 2 (3GPP TS 23.060 version 6.7.0 Release 6); Dec. 2004; pp. 1-211.

3rd Generation Partnership Project (3GPP); Technical Specification Group Core Network; IP Multimedia Call Control Protocol based on Session Initiation Protocol (SIP) and Session Description Protocol; Stage 3, Release 6, V. 6.4.0 (Sep. 2004).

* cited by examiner

HANDLING SUSPENDED NETWORK STATE OF A TERMINAL DEVICE

BACKGROUND TO THE INVENTION

1. Field of the Invention

The present invention relates to a method and terminal device for handling a suspended network state, for example in an Internet Protocol Multimedia Subsystem (IMS).

2. Description of the Related Art

In order to achieve access independence and to maintain a smooth interoperation with wired terminals across the internet, the IMS as specified e.g. in the 3GPP specification TS 23.228 has been developed to be conformant to IETF (Internet Engineering Task Force) "Internet Standards". The IP multimedia core network (IM CN) subsystem enables network operators of mobile or cellular networks to offer their subscribers multimedia services based on and built upon Internet applications, services and protocols. The intention is to develop such services by mobile network operators and other $3^{rd}$ party suppliers including those in the Internet space using the mechanisms provided by the Internet and the IM CN subsystem. The IMS thus enables conversions of, and access to, voice, video, messaging, data and web-based technologies for wireless users, and combines the growth of the Internet with the growth in mobile communications.

FIG. 1 shows an architecture of an IMS network according to the above 3GPP ($3^{rd}$ Generation Partnership Project) specification. The architecture is based on the principle that the service control for home subscribed services for a roaming subscriber is in the home network HN, e.g. a Serving Call State Control Function (S-CSCF) is located in the home network HN. In FIG. 1, an S-CSCF 10 is shown, which controls a terminal device or user equipment (UE) 40. In general, the S-CSCF 10 performs session control service for the served UE 40. It maintains a session state as needed by the network operator for support of the services which may be provided by an application server (AS) 60 which may be located as well in the home network HN or a visited network VN.

Within an operator's network, different S-CSCFs may have different functionalities. The functions performed by the S-CSCF 10 during a respective session may be e.g. registration, session flow management, charging and resource utilization management. When a subscriber roams to the visited network VN, the visited network VN supports a Proxy-CSCF (P-CSCF) 30 which enables the session control to be passed to the respective S-CSCF 10 located at the home network HN and providing the service control. Furthermore, an Interrogating-CSCF (I-CSCF) 50 is provided in the home network HN as a contact point within the operator's network for all connections destined to a subscriber of that network operator, or a roaming subscriber currently located within that network operator's service area. There may be multiple I-CSCFs within an operator's network. The functions performed by the I-CSCF 50 include assigning the S-CSCF 10 or any other S-CSCF to a user performing a registration procedure, routing a request received from another network towards the S-CSCF 10, obtaining the address of the S-CSCF 10 from a subscriber database, e.g. a Home Subscriber Server (HSS) 20 as shown in FIG. 1, and/or forwarding requests or responses to the S-CSCF 10 determined based on the address obtained from the HSS 20.

The P-CSCF 30 is the first contact point within the IMS. Its address may be discovered by the UE 40 following a PDP (Packet Data Protocol) context activation. The P-CSCF 30 behaves like a proxy, i.e. it accepts requests and services them internally or forwards them on, possibly after translation. The P-CSCF 30 may also behave as a User Agent, i.e. in abnormal conditions it may terminate and independently generate transactions. The functions performed by the P-CSCF 30 are forwarding register requests received from the UE 40 to an I-CSCF, e.g. the I-CSCF 50, determined using the home domain name as provided by the UE 40, and forwarding requests or responses to the UE 40.

Further details regarding the functions of the different CSCF elements shown in FIG. 1 can be gathered from the above mentioned 3GPP-specification.

The IETF has been specifying a Session Initiation Protocol (SIP) event package for registrations, as defined in "draft-ietf-sipping-reg-event". Through its REGISTER method, SIP allows a user agent, which is an interface (e.g. browser) between the user and the network application, to create, modify, and delete registrations. Registrations can also be altered by administrators in order to enforce policy. As a result, these registrations represent a piece of state in the network that can change dynamically. There are many cases where a user agent would like to be notified of changes in this state. The event package defines a mechanism by which those user agents can request and obtain such notifications.

The SIP REGISTER method provides a way for a user agent to manipulate registrations. Contacts can be added or removed, and the current set of contacts can be queried. Registrations can also change as a result of administrator policy. For example, if a user is suspected of fraud, his registration can be deleted so that they cannot receive any requests. Registrations also expire after some time if not refreshed. Thus, registrations represent a dynamic piece of state maintained by the network. The SIP Events Framework defines a generic framework for subscription to, and notification of, events related to SIP systems. The framework defines the methods SUBSCRIBE and NOTIFY, and introduces the notion of a package. A package is a concrete application of the event framework to a particular class of events, e.g. registration states.

The SUBSCRIBE message for the registration package may contain a body for filtering the subscription. It may be sent with or without the body. The default registration policy is that notifications are triggered from a SUBSCRIBE message and are generated every time there is a change in the state of any of the registered contacts for the resource being subscribed to. Those notifications only contain information on the contacts whose state has changed. The notifications are forwarded using the NOTIFY message comprising in its body a registration information document which describes some or all of the contacts associated with a particular address-of-record.

Every user has one or more private user identities. The private identity is assigned by the home network operator, and used, for example, for registration, authorisation, administration, and accounting purposes. The private identity takes the form of a Network Access Identifier (NAI) as defined in specification RFC 2486. It is possible for a representation of the IMSI (International Mobile Subscriber Identity) to be contained within the NAI for the private identity. Additionally, every user has one or more public user identities. The public user identity is used by any user for requesting communications to other users. For example, this might be included on a business card.

In the 3GPP IMS Release 5 specifications TS 24.229, 24.228 and 23.218, the SIP registration state event package is used to inform about the user's registration state to the subscribers of the event package. Furthermore, the above specifications require that the UE 40 maintains the registration with the IMS network. It is further specified in the 3GPP specification TS 24.229 that whenever the IMS network sees the need to deregister at least one of the user's registered identities or the user from the network, the S-CSCF 10 generates a NOTIFY request towards the UE 40. If the NOTIFY request includes one or more <registration> elements with a state attribute set to "terminated" and an event attribute set to "rejected" or "deactivated", the UE 40 must remove all registration details related to these public user identities. If the event attribute is "deactivated", the UE 40 must start the initial registration procedure. If the event is "rejected", the UE 40 must release all dialogs that use those public identities.

In case the UE 40 receives a NOTIFY request in which all <registration> elements have their state attribute set to "terminated" and a Subscription-State header contains a value "terminated", the UE 40 must delete security associations towards the P-CSCF 30 after NOTIFY server transaction terminates, i.e. the network has deregistered the user from the network.

However, if a network connection (e.g. PDP context) towards the UE 40 is suspended for a while, for instance due to a circuit switched call in GERAN (GSM/EDGE radio access network) without DTM (Dual Transfer Mode) support in the UE 40, the NOTIFY request may not reach the UE 40 and it will remain in an inconsistent state after the network connection is resumed again. This inconsistent state means that the UE 40 will have available only invalid information about the registration state of the user or of some of the user's public identities. Consequently, in this case, the above requirements set out by the 3GPP specification TS 24.229 are violated. The end user and the UE 40 assume a valid registration to the network, while this is no longer the case. In this case, initiation or reception of services relating to the deregistered user identity/identities is no longer possible, but the end user cannot understand a reason for this, since he still assumes a valid registration.

SUMMARY OF THE INVENTION

It is therefore an object of the present invention to provide a method and terminal device, by means of which a consistent registration state can be maintained at the terminal device even after a temporary suspension of the network connection.

This object is achieved by a method of handling a suspended network state, said method comprising the steps of:
  detecting the end of said suspended network state;
  subscribing to a registration state information in response to a detected end of said suspended network state;
  checking a response to said subscription step; and
  updating registration states of user identities based on information given in said response.

Furthermore, the above object is achieved by a terminal device for handling a suspended network state, said terminal device comprising:
  packet connection control means for maintaining state information of a packet connection, and configured to generate an indication of end of suspension in said packet connection;
  requesting means for requesting registration state information of at least one user identity in response to a detection of aid indication; and
  determining means for determining registration states of said at least one user identity based on a response to said request.

Accordingly, the terminal device is enabled to always maintain an up-to-date registration state of the user and/or of the user's identities.

Additionally, the terminal device may comprise identity maintaining means for maintaining registration state information of user identities; and updating means for updating said registration state information of user identities maintained by said identity maintaining means based on information given by said determining means.

The requesting means may be configured to subscribe to a registration state event package. On one hand, an initial registration of a user may be performed, if the information given in the response indicates a de-registration of the user. In this case, the information may be derived from the type of the response. On the other hand, a registration of at least one predetermined user identity may be performed, if the information given in the response indicates a de-registration of the at least one predetermined user identity. In this case, the information may be derived from a notification received together with the response as a result of the subscription. As an example, the information may be derived from at least one event attribute indicated in the notification.

The subscription may be performed to a call sate control function of an IP multimedia subsystem. It may be based on a SIP SUBSCRIBE method, wherein the notification is a SIP NOTIFY request.

Further advantageous modifications or developments are defined in the dependent claims.

One embodiment of the present invention is a computer program product executable by a digital computer, embodied on a computer readable storage medium. When the computer program product is executed by a digital computer, a process is performed. The process includes detecting an end of a suspended network state of a terminal device. Additionally, the process includes subscribing to registration state information of said terminal device in response to the detected end of said suspended network. The process further includes checking a response to said subscribing from an internet protocol multimedia subsystem to which the subscription was made. The process additionally includes updating registration states of user identities of a user of said terminal device based on information given in said response.

BRIEF DESCRIPTION OF THE DRAWINGS

In the following, the present invention will be described in greater detail based on an embodiment with reference to the accompanying drawings, in which.

DESCRIPTION OF THE PREFERRED EMBODIMENTS

Figure 1:
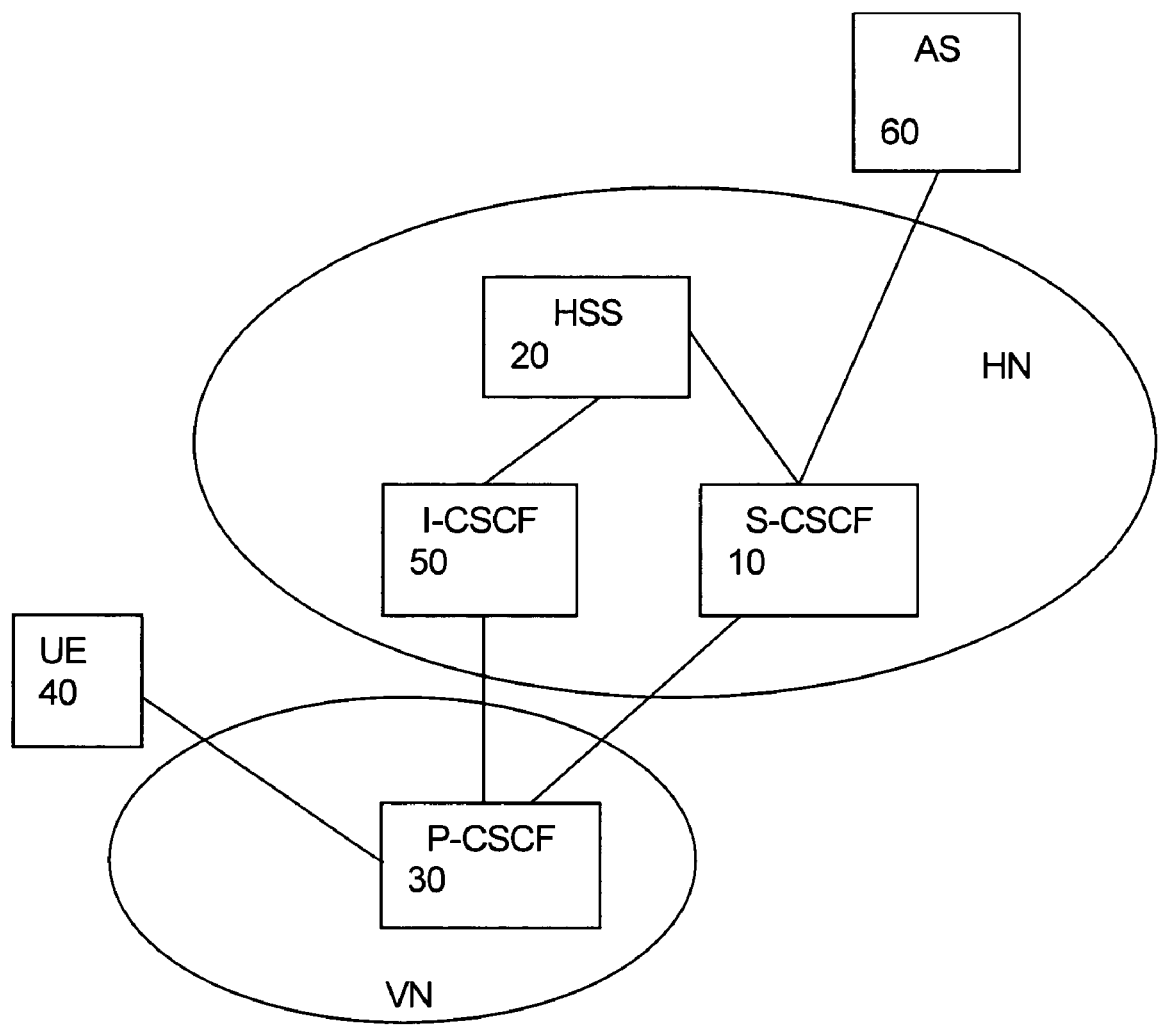
FIG. 1 shows a schematic block diagram of a network architecture in which the embodiment of the present invention can be implemented.

The embodiment will now be described based on an IMS network architecture as shown in FIG. 1.

The IMS architecture shown in FIG. 1 refers to a set of core network entities using the services provided by the packet-switched domain to offer multimedia services. The HSS 20 is the master database for a given user and includes the functions of conventional home location registers (HLRs) as well as new functionalities specified to IP networks, such as the IMS. The HSS 20 is the entity containing the subscription-related information to support the network entities actually handling calls and/or sessions.

If an ungraceful session termination occurs (e.g. flat battery or mobile leaves coverage), when a stateful proxy server, such as the S-CSCF 10, is involved in a session, memory leaks and eventually server failure can occur due to hanging state machines. To ensure stable S-CSCF operation and carrier grade service, the IM CN subsystem can initiate a Network Initiated De-Registration procedure.

Two types of network-initiated de-registration procedures are required to deal with registrations expirations, and to allow the network to force de-registrations following any of the approved possible causes for this to occur. For different reasons (e.g., subscription termination, lost terminal, etc.) a home network administrative function may determine a need to clear a user's SIP registration. This function initiates the de-registration procedure and may reside in various elements depending on the exact reason for initiating the de-registration. One such home network element is the HSS 20, which already knows the S-CSCF 10 serving the user and that for this purpose makes use of de-registration. Another home network element that could initiate the de-registration is the S-CSCF 10, in which case it makes use of a Cx-Put method to inform the HSS 20. Other trusted/secured parties may also initiate deregistration to the S-CSCF.

Due to loss of contact with the UE 40 (e.g. in case of a network suspension), it might be possible that the UE 40 does not receive the information of de-registration from the IMS network. In practice, the problem of connection suspension may for example occur in cases were the UE 40 is not capable of simultaneous circuit switched and packet switched communication. That is, during a circuit switched call, the PDP connection is suspended. However, other reasons, such as interruptions or the like, may lead to the same problem.

According to the present embodiment, the UE 40 (re-)subscribes to the network if a suspension of the connection to the IMS network has occurred. After the end of the suspension has been determined or detected at the UE 40, it subscribes to the registration event package for the public user identity registered at the users registrar (i.e. S-CSCF 10) as described in IETF specification RFC 3680. The UE 40 may use either a default public user identity or the public user identity used for initial registration for the subscription to the registration-state event package. Based on the network response received from the IMS network, i.e. the S-CSCF 10, the UE 40 can derive correct registration status of identities and decide on the requirement of any (re-)registrations of identities.

Figure 2:
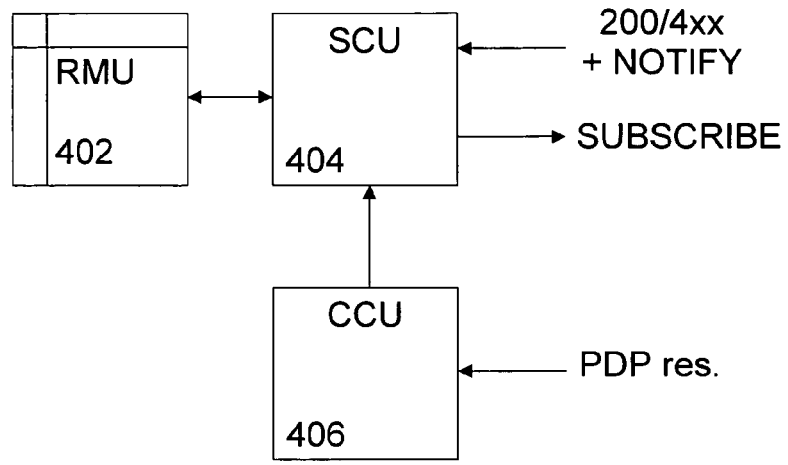
FIG. 2 shows a schematic block diagram of terminal device functionalities according to the embodiment of the present invention.

FIG. 2 shows a schematic block diagram of functionalities provided in the UE 40 according to the embodiment. The functionalities may be implemented as discrete hardware units or blocks or as software routines based on which a processing device or means arranged in the UE 40 is controlled, or as a combination of both.

According to FIG. 2, the UE 40 may comprise a registration maintenance unit 402 having a logic for maintaining registration status information of user's public identities in a table or other memory means. Furthermore, the UE 40 may implement an application to allow the end user to easily check which identities are currently registered to the network. As described above, due to a missed de-registration (e.g. NOTIFY) during a suspension of the packet connection, the logic for maintaining registration status information may have inconsistent registration states for some of the public identities. The UE 40 is thereby able to update registration states according to the response received from the S-CSCF 10 after the suspension.

The SIP layer functionality of a session control unit 404 of the UE 40 can be notified by a packet connection control unit 406 of the packet connection suspension. To achieve this, the packet connection control unit 406 monitors or takes care of the packet connection and, e.g., maintains a PDP (Packet Data Protocol) state information. Then, when a packet connection is resumed, the packet connection control unit 406 detects this resumption (e.g. PDP resume) and generates some kind of indication to the SIP layer functionality of the session control unit 404 which then sends a (re-)SUBSCRIBE to the network. In reply to this subscription, the session control unit 404 receives a SIP response with a NOTIFY, so that it can control or inform the registration maintenance unit 402 to update the registration status information in accordance with the registration state information obtained from the received NOTIFY response.

The registration maintenance unit 402 offers an end user to get knowledge of his current (active) registrations. The maintained registration status information is updated after a packet connection suspension in case some parts of this information have changed. Thereby, updated or up-to-date registration status information is continuously available at the UE 40.

Figure 3:
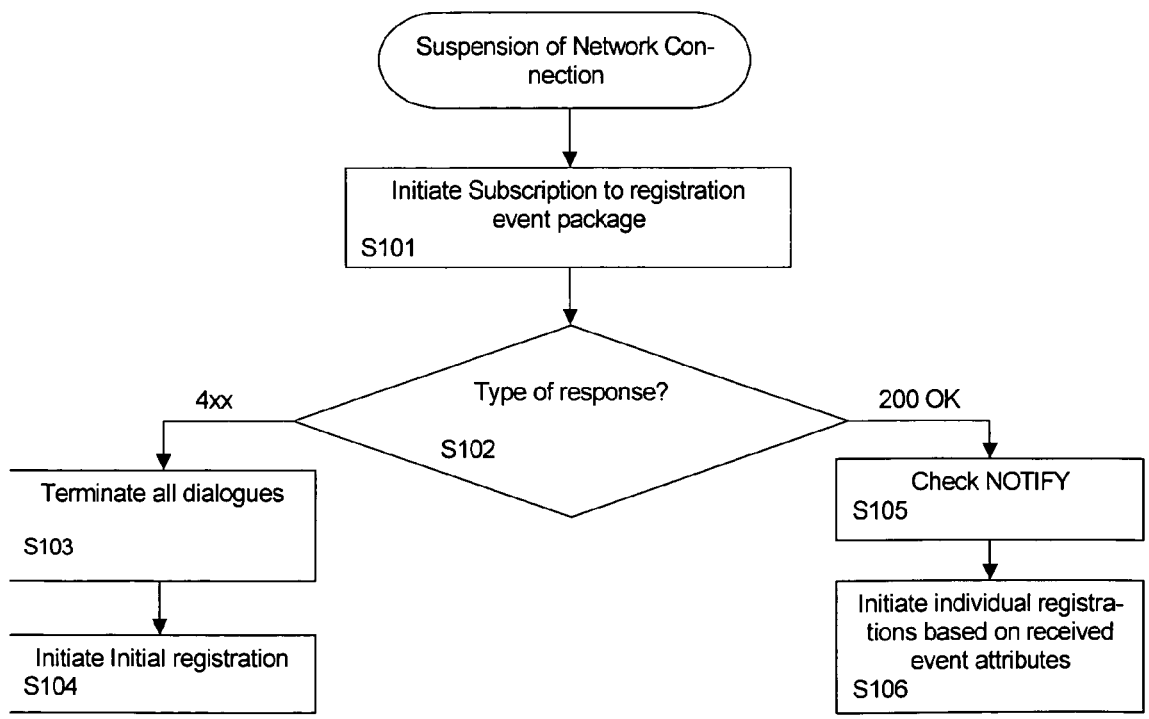
FIG. 3 shows a message signaling and processing diagram indicating delivery of a notification to an IMS subscriber according to the embodiment.

FIG. 3 shows a schematic flow diagram of a processing routine which is initiated or triggered at the UE 40 if a suspension or interruption of the connection to the IMS network has occurred.

After the packet connection control unit 406 indicates that the network connection is resumed from being suspended, the session control unit 404 of the UE 40 generates a (re-)SUBSCRIBE for registration event package request towards the S-CSCF 10 (step S101). Then, in step 102, the session control unit 404 waits for the receipt of the response from the S-CSCF 10 and checks the type of response. In case the user was deregistered during the suspended network connection, a 4xx response will be received in response to the SUBSCRIBE request. If the session control unit 404 detects in step S102 that a 4xx response has been received, it must assume that all IMS public user identities are deregistered and terminates all dialogs using IMS public identities (step S103). Thereafter, it may perform an initial registration procedure as defined in 3GPP specification TS 23.228, by generating a REGISTER message comprising desired private and public identities (step S104).

In case that only some of the user's identities were deregistered during the suspended network connection, the session control unit 404 will receive a 200 OK and a NOTIFY message after sending the SUBSCRIBE request. The NOTIFY request generated by S-CSCF 10 will contain information about the deregistered public user identities. Hence, if the session control unit 404 detects in step S102 that it has received a 200 OK, it waits for the receipt of the NOTIFY request and checks the setting of the event attributes (step S105). Depending on the detected event attribute ("rejected" or "deactivated", as defined in the 3GPP specification TS 24.229), the session control unit 404 may initiate individual registrations for desired identities which had been rejected or deactivated during the suspension of the connection (step S106). Thereby, an up-to-date registration state can be maintained at the registration maintenance unit 402 even after the suspension or interruption.

Figure 4:
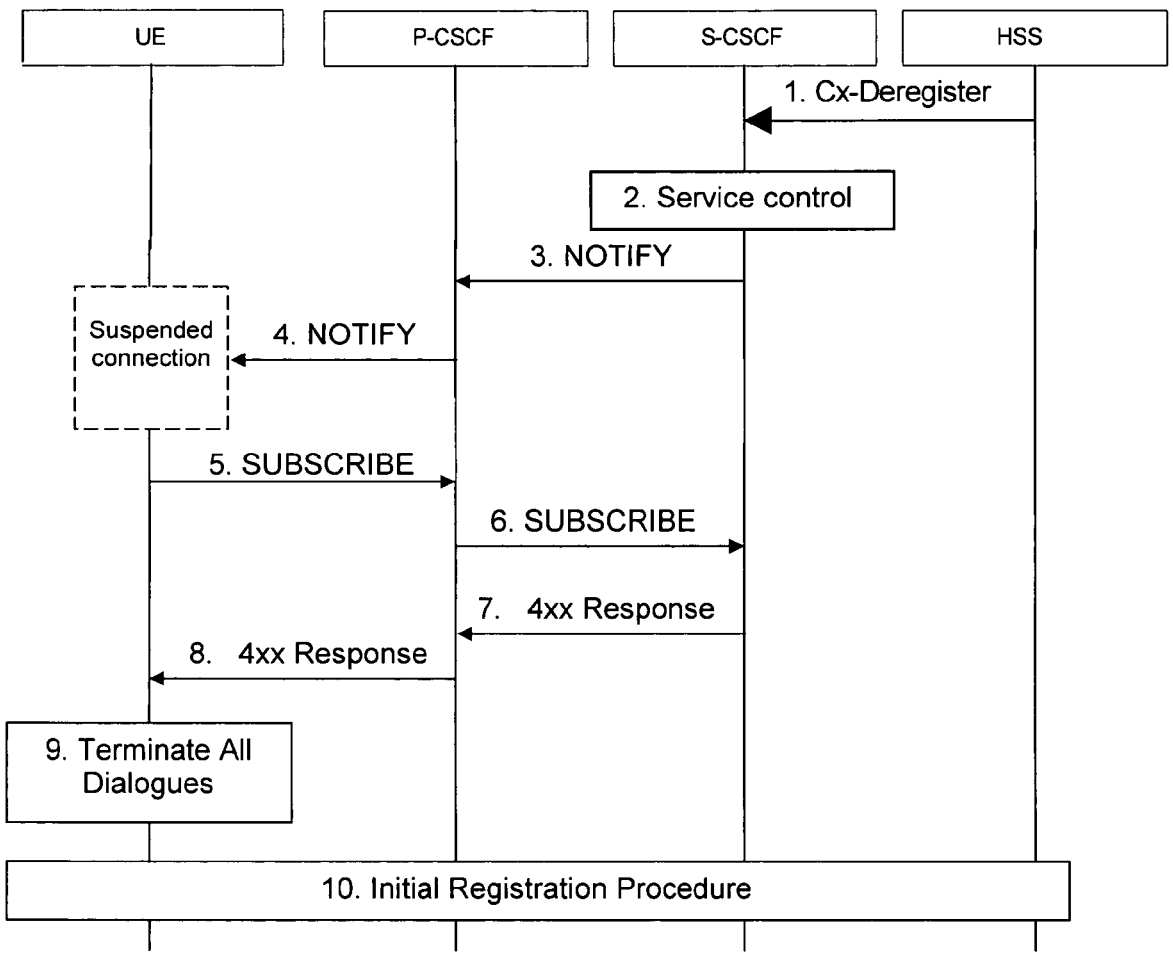
FIG. 4 shows a message signaling and processing diagram indicating delivery of a notification to an IMS subscriber according to a first example of the second embodiment.

FIG. 4 shows a schematic signaling diagram according to a first example of the embodiment where the UE 40 initiates subscription to the registration state event package and determines that the user has been deregistered.

In step 1, the HSS 20 may initiate a de-registration by sending a Cx-Deregister indicating that the user and thus all public user identities are deregistered and the reason for the de-registration. Based on filter criteria applied in a service control step 2, the S-CSCF 10 sends de-registration information to the service control platform and perform whatever service control procedures are appropriate. Then, in step 3, the S-CSCF 10 issues a NOTIFY request towards the P-CSCF 30 for this user and updates its internal database to remove the user from being registered. The reason for the de-registration received from the HSS 20 may be included if available. In step 4, the P-CSCF 30 forwards the NOTIFY request to the UE 40. Due to loss of contact as a result of a suspended connection, the UE 40 does not receive the NOTIFY request and cannot update its registration status. The P-CSCF 30 may resend the NOTIFY several times (not shown in the figure) if no acknowledgement is receive from the UE 40. However, the lack of acknowledgement does not change the fact that the registrations have been deleted in the network.

After the end of suspension has been determined at the UE 40, the UE 40 generates a (re-)SUBSCRIBE for registration event package request and forwards it via the P-CSCF 10 (step 5) to the S-CSCF 10 (step 6). In response thereto, the S-CSCF 10 issues a 4xx response and forwards it via the P-CSCF 30 (step 7) to the UE 40 (step 8). Due to the fact that the UE 40 assumes from the 4xx response that all IMS public user identities are deregistered, it terminates all dialogs using IMS public identities (step 9). Thereafter, it may perform an initial registration procedure as defined in 3GPP specification TS 23.228 (step 10).

Figure 5:
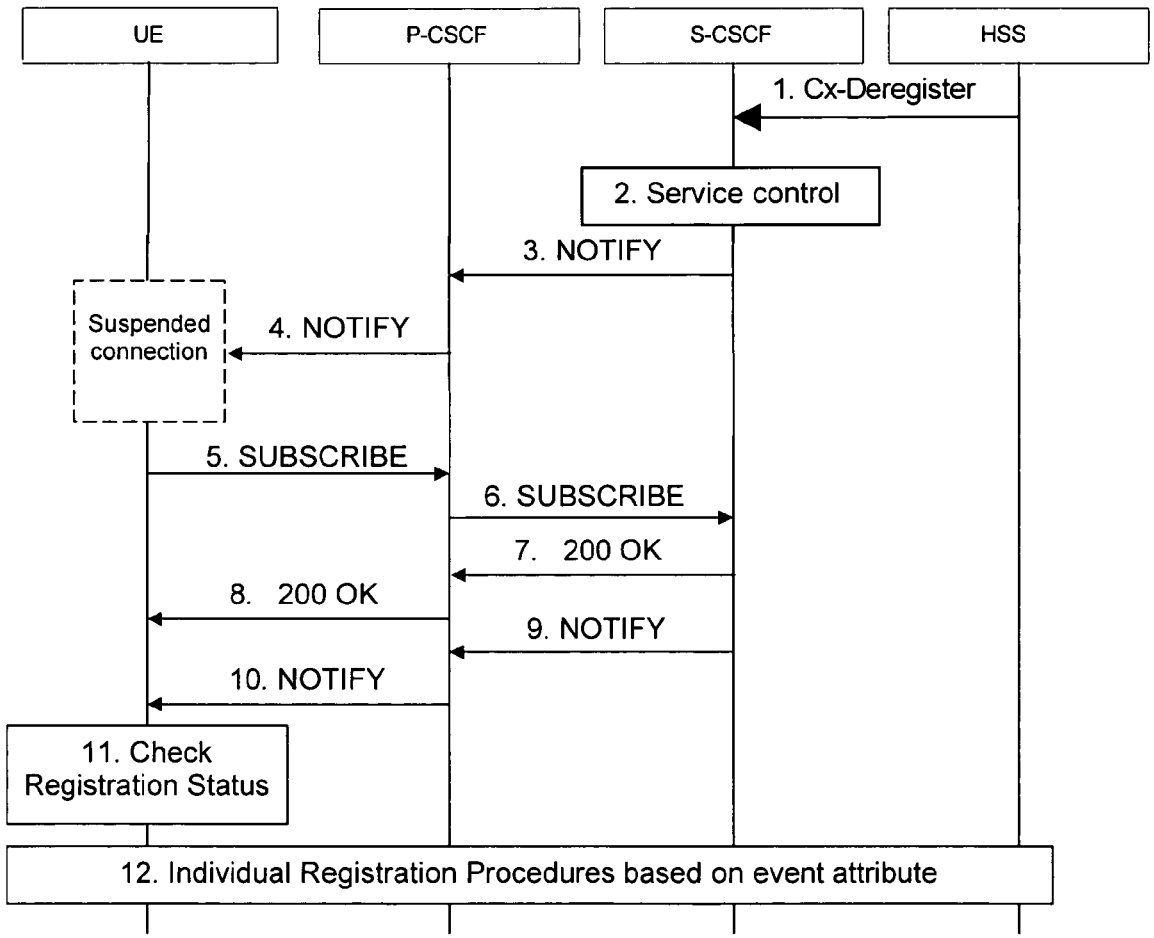
FIG. 5 shows a message signaling an processing diagram indicating a subscription to a registration state event package according to a second example of the embodiment.

FIG. 5 shows a schematic signaling diagram according to a second example of the embodiment where the UE 40 initiates subscription to the registration state event package and determines that the user has not been deregistered but only at least one public identity.

In FIG. 5, steps 1 to 6 are identical to the corresponding steps of FIG. 4 with the exception that the HSS 20 now initiates a de-registration by sending a Cx-Deregister indicating that at least one but not all public user identities are deregistered and the reason for the de-registration.

In the present second example, only at least one but not all of the user's identities were deregistered during the suspended network connection. Therefore, the S-CSCF 10 issues a 200 OK response via the P-CSCF 30 (step 7) to the UE 40 (step 8). Additionally, the S-CSCF 10 generates a NOTIFY request (step 9). The NOTIFY request generated by S-CSCF 10 will contain information about the deregistered public user identities and is forwarded via the P-CSCF 30 to the UE 40 (step 10). In step 11 the UE 40 checks the registration status based on the information (event attributes) given in the NOTIFY request. Then, depending on the detected event attributes, the UE 40 may initiate individual registrations for desired identities which had been rejected or deactivated during the suspension of the connection (step 12).

In summary, a method and terminal device for handling a suspended network state is described, wherein the end of a suspended network state is detected and subscription to a state event package is initiated in response to the detected end of suspension. Based on information given in a response to the subscription, registrations of user identities are updated. Thereby, the registration state of the user and the user's identities can always be kept actual, even after a suspension of the network connection.

It is noted that the present invention is not restricted to the embodiment described above. The present invention may be implemented in any data network, where a subscription to a registration state of a subscriber can be implemented to thereby keep terminal devices informed about the actual registration status after any suspension, interruption or disruption of the network connection. The embodiments may thus vary within the scope of the attached claims.

The invention claimed is:

1. A method, comprising:
   detecting at a terminal device an end of a suspended network state;
   subscribing to registration state information of said terminal device in response to the detected end of said suspended network to cause a response to be generated, the response including information indicative of deregistration of previously registered user identities during the suspended network state;
   checking the response to said subscribing; and
   updating registration states of the user identities of a user of said terminal device based on the information given in said response;
   wherein based on the information given in said response:
      performing individual registration of at least one of the deregistered user identities when the response identifies that only some of the previously registered user identities have been deregistered during the suspended network state, and
      performing an initial registration procedure, including generating a register message comprising desired private and public identities, when the response includes information indicative that all previously registered user identities have been deregistered.

2. The method of claim 1, wherein said subscribing to registration state information comprises subscribing to a registration state event package.

3. The method of claim 1, wherein said information is derived from a type of said response.

4. The method of claim 1, wherein said information is derived from a notification received together with said response as a result of said subscribing.

5. The method of claim 4, wherein said information is derived from at least one event attribute indicated in said notification.

6. The method of claim 5, wherein said notification is a session initiation protocol notify request.

7. The method of claim 1, wherein said subscribing is initiated by a session initiation protocol subscribe method.

8. The method of claim 1, wherein said subscribing is performed to a call state control function of an internet protocol multimedia subsystem.

9. An apparatus, comprising:
   packet connection control means for maintaining state information of a packet connection of said apparatus, and configured to generate an indication of an end of suspension in said packet connection;
   requesting means for requesting registration state information of at least one user identity of a user of said apparatus in response to a detection of said indication to cause a response to be generated that includes information indicative of extent of deregistration of previously registered user identities during the suspended network state;
   determining means for determining registration states of said at least one user identity based on the response to a request by the requesting means;

registration means for performing individual registration of at least one of the deregistered user identities when the response identifies that only some of the previously registered user identities have been deregistered during the suspended network state; and initial registration means for performing an initial registration procedure, including generating a register message comprising desired private and public identities, when the response includes information indicative that all previously registered user identities have been deregistered.

10. A computer program product executable by a digital computer, embodied on a non-transitory computer readable storage medium, whereby, when said computer program product is executed by a digital computer, the following are performed:

detecting an end of a suspended network state of a terminal device;

subscribing to registration state information of said terminal device in response to the detected end of said suspended network to cause a response to be sent back to the terminal device, the response including information indicative of extent of deregistration of previously registered user identities during the suspended network state;

checking the response to said subscribing; and updating registration states of the user identities of a user of said terminal device based on the information given in said response;

wherein based on the information given in said response:
performing individual registration of at least one of the deregistered user identities when the response identifies that only some of the previously registered user identities have been deregistered during the suspended network state, and performing an initial registration procedure, including generating a register message comprising desired private and public identities, when the response includes information indicative that all previously registered user identities have been deregistered.

11. An apparatus, comprising:

a packet connection controller configured to maintain state information of a packet connection of said apparatus, and configured to generate an indication of an end of suspension in said packet connection;

a requestor configured to request registration state information of at least one user identity of a user of said apparatus in response to a detection of said indication to cause a response to be generated that includes information indicative of extent of deregistration of previously registered user identities during the suspended network state;

a registration state determiner configured to determine registration states of said at least one user identity based on the response to a request by the requestor;

a registration controller configured to perform individual registration of at least one of the deregistered user identities when the response identifies that only some of the previously registered user identities have been deregistered during the suspended network state; and an initial registration controller configured to perform an initial registration procedure, including generating a register message comprising desired private and public identities, when the response includes information indicative that all previously registered user identities have been deregistered.

12. The apparatus of claim 11, further comprising: a registration state controller configured to maintain registration state information of user identities and to update said registration state information based on information given by said determiner.

13. The apparatus of claim 11, wherein said apparatus is a mobile terminal device.

14. The apparatus of claim 11, wherein said requestor is configured to subscribe to a registration state event package.

15. The apparatus of claim 11, wherein said determiner is configured to derive said information from a type of said response.

16. The apparatus of claim 11, wherein said determiner is configured to derive said information from a notification received together with said response.

17. The apparatus of claim 16, wherein said determiner is configured to derive said information from at least one event attribute indicated in said notification.

18. The apparatus of claim 17, wherein said notification is a session initiation protocol notify request.

19. The apparatus of claim 11, wherein said requestor is configured to request by using a session initiation protocol subscribe message.

20. The apparatus of claim 19, wherein said requestor is configured to transmit said session initiation protocol subscribe message to a call state control function of an internet protocol multimedia subsystem.

* * * * *